United States Patent
Fujiwara et al.

(10) Patent No.: US 9,342,925 B2
(45) Date of Patent: May 17, 2016

(54) INFORMATION PROCESSING APPARATUS, INFORMATION PROCESSING METHOD, AND PROGRAM

(75) Inventors: Tatsuo Fujiwara, Tokyo (JP); Naoyuki Onoe, Kanagawa (JP); Junichi Yamashita, Saitama (JP); Yun Sun, Tokyo (JP); Naoki Kobayashi, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 316 days.

(21) Appl. No.: 13/552,963

(22) Filed: Jul. 19, 2012

(65) Prior Publication Data
US 2013/0027393 A1    Jan. 31, 2013

(30) Foreign Application Priority Data
Jul. 28, 2011    (JP) ................................. 2011-165129

(51) Int. Cl.
*G06T 15/00*    (2011.01)
*G06T 15/20*    (2011.01)

(52) U.S. Cl.
CPC ..................................... *G06T 15/20* (2013.01)

(58) Field of Classification Search
CPC ..................................................... G06T 15/20
See application file for complete search history.

(56) References Cited

U.S. PATENT DOCUMENTS

| | | | |
|---|---|---|---|
| 6,226,008 B1* | 5/2001 | Watanabe et al. | 345/427 |
| 8,704,879 B1* | 4/2014 | Cheng et al. | 348/51 |
| 2004/0141014 A1* | 7/2004 | Kamiwada | G06T 15/20 |
| | | | 715/848 |
| 2005/0232467 A1* | 10/2005 | Mohri | G06F 3/0304 |
| | | | 382/103 |
| 2005/0272506 A1* | 12/2005 | Sumi | 463/51 |
| 2010/0253489 A1 | 10/2010 | Cui et al. | |
| 2011/0159957 A1* | 6/2011 | Kawaguchi | A63F 13/08 |
| | | | 463/31 |

FOREIGN PATENT DOCUMENTS

| | | | | |
|---|---|---|---|---|
| JP | 11-235466 | | 8/1999 | |
| JP | 2000-222097 | | 8/2000 | |
| JP | 2000-242809 | | 9/2000 | |
| JP | 2005-310020 | | 11/2005 | |
| JP | 2009-517745 | | 4/2009 | |
| JP | 2010-122879 | | 6/2010 | |
| WO | WO 2007/062478 | * | 6/2007 | ............... G06K 9/46 |
| WO | WO2010-001756 | | 1/2010 | |

OTHER PUBLICATIONS

Jul. 7, 2015, JP communication issued for related JP application No. 2011-165129.

* cited by examiner

*Primary Examiner* — Sing-Wai Wu
(74) *Attorney, Agent, or Firm* — Paratus Law Group, PLLC

(57) ABSTRACT

An information processing apparatus includes an image generation unit configured to generate a viewpoint image in a case where a watch point set in a three-dimensional virtual space is viewed from a predetermined virtual viewpoint, a detection unit configured to detect a movement of an operator, and a viewpoint displacement unit configured to displace the virtual viewpoint with the set watch point as a reference on the basis of the detected movement of the operator.

20 Claims, 11 Drawing Sheets

INFORMATION PROCESSING APPARATUS, INFORMATION PROCESSING METHOD, AND PROGRAM

BACKGROUND

The present disclosure relates to an information processing apparatus, an information processing method, and a program which are capable of displaying an image or the like in a three-dimensional virtual space.

There is known a system for taking an image of an operator with a use of an image sensor to measure face parameters such as a head posture, a watch direction, an eye closure, and expression. For example, as disclosed in Japanese Patent Translation Publication No. 2009-517745 (hereinafter, referred to as Patent Document 1), the face parameters measured are used to measure a dialogue between a system and an operator in a field of a human machine interface (HMI) design or the like. Further, Patent Document 1 discloses an automobile driver assistance system that derives fatigue and distraction information from the face parameters (see, paragraphs 0005, 0006, etc. of Patent Document 1).

SUMMARY

Further, Patent Document 1 discloses that a tracking system of a face and a watching with the use of the face parameters mentioned above may become widespread (ubiquitous) as much as a computer keyboard and a mouse are spread, as an interface with respect to a personal computer is developed (see, paragraph 0007 etc. of Patent Document 1). In other words, it is thought that an information processing system based on the movement of an operator as the tracking system mentioned above become widespread.

In view of the above mentioned circumstances, it is desirable to provide an information processing apparatus, an information processing method, and a program which are capable of achieving an image display system with high operability based on the movement of an operator.

According to an embodiment of the present disclosure, there is provided an information processing apparatus including an image generation unit, a detection unit, and a viewpoint displacement unit.

The image generation unit is configured to generate a viewpoint image in a case where a watch point set in a three-dimensional virtual space is viewed from a predetermined virtual viewpoint.

The detection unit is configured to detect a movement of an operator.

The viewpoint displacement unit is configured to displace the virtual viewpoint with the set watch point as a reference on the basis of the detected movement of the operator.

In the information processing apparatus, the viewpoint image in the case where the watch point is viewed from the predetermined virtual viewpoint is generated. On the basis of the movement of the operator, the virtual viewpoint is displaced with the set watch point as a reference. As a result, it is possible to attain the image display system with high operability which is based on the movement of the operator.

The viewpoint displacement unit may be configured to displace the virtual viewpoint with the set watch point as a center.

As a result, it is possible to perform such an instinctive operation as to come around the watch point to view the point in a three-dimensional virtual space, for example.

The detection unit may be configured to detect the movement of the operator from a taken image of the operator.

As a result, it is possible to detect the movement of the operator on the basis of the image of the operator with high accuracy.

The detection unit may be configured to detect a position of a face of the operator. In this case, the viewpoint displacement unit may be configured to displace the virtual viewpoint on the basis of a displacement of the position of the face.

In this way, on the basis of the displacement of the position of the face, the virtual viewpoint may be displaced. As a result, it is possible to perform such an instinctive operation as to view the watch point by moving the face.

The detection unit may be configured to detect a direction of a face of the operator. In this case, the viewpoint displacement unit may be configured to displace the virtual viewpoint on the basis of a displacement of the direction of the face.

In this way, on the basis of the displacement of the direction of the face, the virtual viewpoint may be displaced. As a result, it is possible to perform such an instinctive operation as to view the watch point by moving the face.

The detection unit may be configured to detect a movement of a hand of the operator. In this case, the viewpoint displacement unit may be configured to displace the virtual viewpoint on the basis of the movement of the hand.

In this way, on the basis of the movement of the hand, the virtual viewpoint may be displaced. As a result, it is possible to perform such an instinctive operation as to view a surrounding or the like of the watch point while rotating the watch point with the hand.

The information processing apparatus may further include a setting unit configured to set the watch point.

With this structure, for example, it is possible to perform an operation of setting the watch point with respect to an object or the like on which an attention is focused in the virtual space.

The information processing apparatus may further include an interface unit configured to receive an operation by the operator. In this case, the setting unit may set the watch point on the basis of the operation received by the interface unit.

In this way, the watch point may be set through the operation by the operator. As a result, it is possible to improve the operability.

The setting unit may set the watch point on the basis of the detected movement of the operator.

In this way, the watch point may be set on the basis of the movement of the operator. As a result, it is possible to improve the operability.

The information processing apparatus may further include a watch point displacement unit and a switching unit.

The watch point displacement unit is configured to displace the watch point with the virtual viewpoint as a reference.

The switching unit is configured to switch between the viewpoint displacement unit and the watch point displacement unit.

With this structure, it is possible to switch the viewpoint control with the point viewed as a reference. As a result, it is possible to attain the image display system with high operability.

According to an embodiment of the present disclosure, there is provided an information processing method including generating a viewpoint image in a case where a watch point set in a three-dimensional virtual space is viewed from a predetermined virtual viewpoint.

A movement of an operator is detected.

The virtual viewpoint is displaced with the set watch point as a reference on the basis of the detected movement of the operator.

According to another embodiment of the present disclosure, there is provided a program causing a computer to execute a generating step, a detecting step, and a displacing step.

The generating step generates a viewpoint image in a case where a watch point set in a three-dimensional virtual space is viewed from a predetermined virtual viewpoint.

The detecting step detects a movement of an operator.

The displacing step displaces the virtual viewpoint with the set watch point as a reference on the basis of the detected movement of the operator.

As described above, according to the embodiments of the present disclosure, it is possible to attain the image display system with high operability which is based on the movement of the operator.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

First Embodiment

Figure 1:
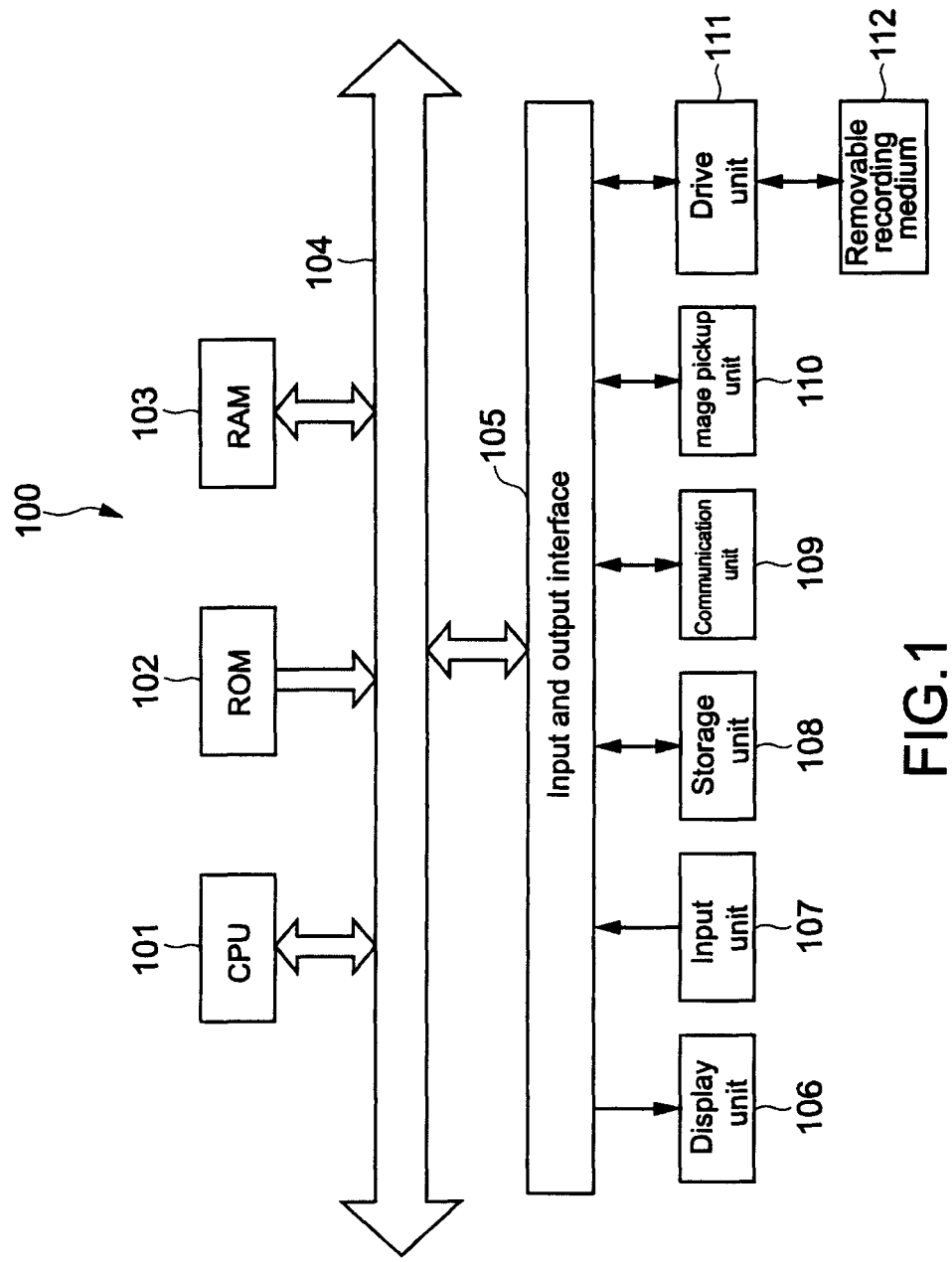
FIG. 1 is a block diagram showing the structure of an information processing system including at least an information processing apparatus according to a first embodiment of the present disclosure.

FIG. 1 is a block diagram showing the structure of an information processing system including at least an information processing apparatus according to a first embodiment of the present disclosure. As an information processing apparatus 100, various computers such as a gaming apparatus and a PC (Personal Computer) are used.

The information processing apparatus 100 according to this embodiment performs rendering of a 3D object constituted of a plurality of polygons and the like disposed in a 3D virtual space. Such a 3D graphic is used in a CAD (Computer Aided Design), a game, or the like.

The information processing apparatus 100 is provided with a CPU (Central Processing Unit) 101, a ROM (Read Only Memory) 102, a RAM (Random Access Memory) 103, an input and output interface 105, and a bus 104 which connects those.

To the input and output interface 105, a display unit 106, an input unit 107, a storage unit 108, a communication unit 109, an image pickup unit 110, a drive unit 111, and the like are connected.

The display unit 106 is a display device which uses liquid crystal, EL (Electro-Luminescence), or a CRT (Cathode Ray Tube), for example.

The input unit 107 is, for example, a controller, a pointing device, a keyboard, a touch panel, or another operation device. In the case where the input unit 107 includes a touch panel, the touch panel can be provided integrally with the display unit 106. In this embodiment, an operation by an operator is received by the input and output interface 105 through the input unit 107.

The storage unit 108 is a nonvolatile storage device such as an HDD (Hard Disk Drive), a flash memory, and another solid-state memory.

The image pickup unit 110 has an image pickup control unit, an image pickup element, and an image pickup optical system, which are not shown. As the image pickup element, a CMOS (Complementary Metal Oxide Semiconductor) sensor, a CCD (Charge Coupled Device) sensor, or the like is used. The image pickup optical system causes a subject image to be imaged on an image pickup surface of the image pickup element. The image pickup control unit drives the image pickup element and performs signal processing with respect to an image signal output from the image pickup element on the basis of an instruction from the CPU 101.

In this embodiment, as the image pickup unit 110, a facing camera is provided above the display unit 106. With the facing camera, an operator who plays a game or the like by using the information processing apparatus 100 is photographed.

The drive unit 111 is a device which is capable of driving a removable recording medium 112 such as an optical recording medium, a floppy (registered trademark) disk, a magnetic recording tape, and a flash memory. In contrast, the storage unit 108 is often used as a device equipped to the information processing apparatus 100 in advance which mainly drives a non-removable recording medium.

The communication unit 109 is a modem, a router, or another communication apparatus for communicating with another device, which can be connected to a LAN (Local Area Network), a WAN (Wide Area Network), or the like. The communication unit 109 may perform wired or wireless communication. The communication unit 109 is often used separately from the information processing apparatus 100.

Figure 2:
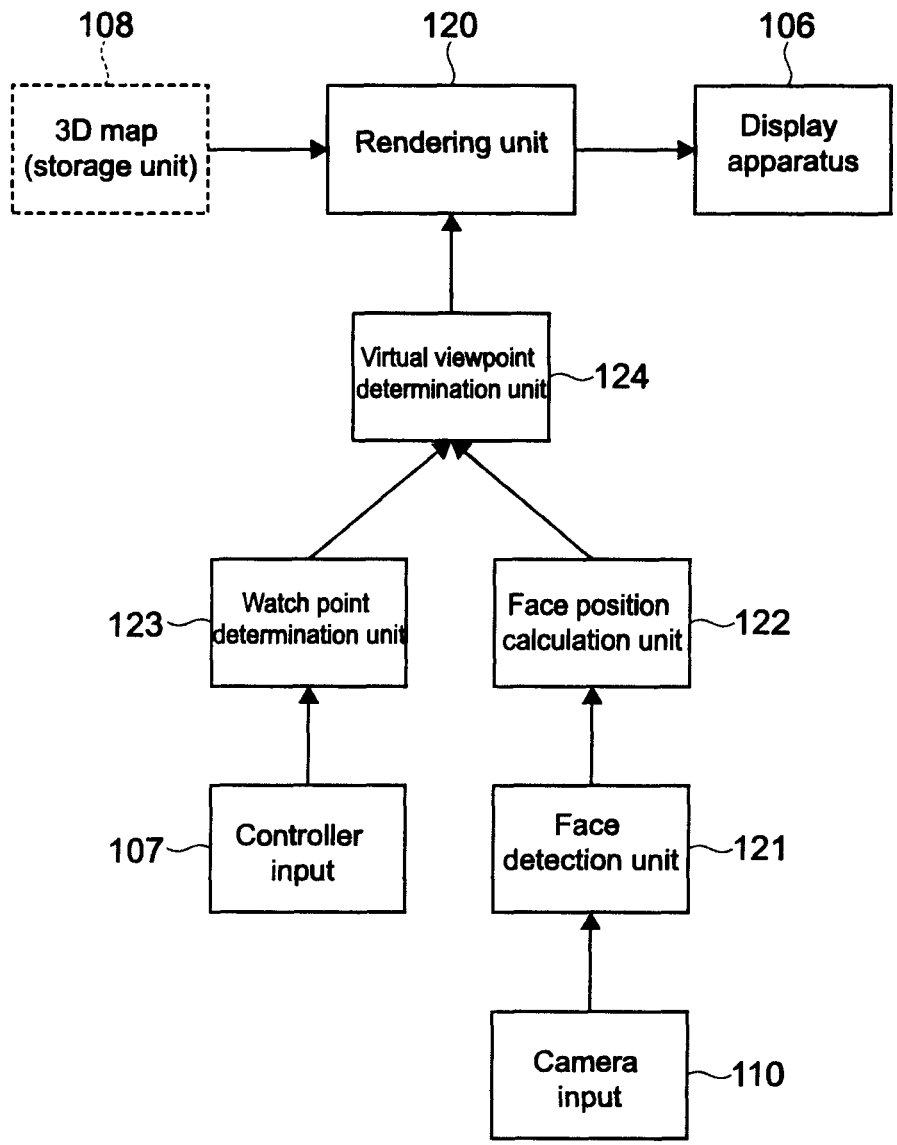
FIG. 2 is a schematic diagram for explaining a functional structure example of the information processing apparatus according to the first embodiment.

FIG. 2 is a schematic diagram for explaining a functional structure example of the information processing apparatus 100 according to this embodiment. Functional blocks shown in FIG. 2 are implemented by causing a software resource such as a program stored in the ROM 102 or the storage unit 108 shown in FIG. 1 and a hardware resource such as the CPU 101 to cooperate with each other.

The program is installed in the information processing apparatus 100 from the recording medium 112, for example. Alternatively, the program may be installed in the information processing apparatus 100 through the communication unit 109.

As shown in FIG. 2, the information processing apparatus 100 has a rendering unit 120, a face detection unit 121, a face position calculation unit 122, a watch point determination unit 123, and a virtual viewpoint determination unit 124.

The rendering unit 120 generates a viewpoint image in the case where a watch point set in a 3D virtual space is viewed from a predetermined virtual viewpoint. That is, in this embodiment, on the basis of information relating to 3D coordinates of the watch point and the virtual viewpoint and directions thereof, the viewpoint image that represents the 3D virtual space is generated. The rendering unit 120 functions as an image generation unit in this embodiment.

Figure 3:
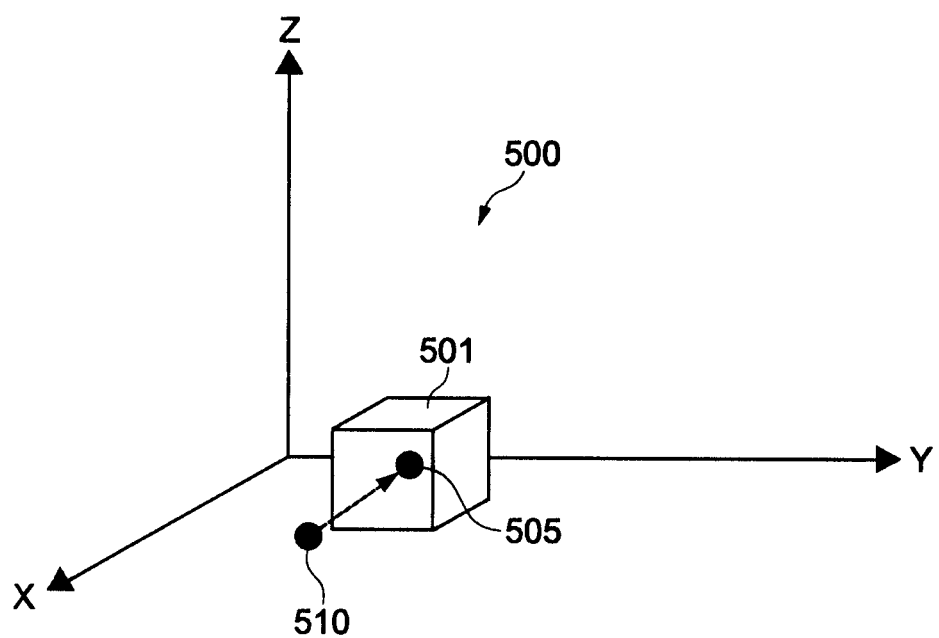
FIG. 3 is a schematic diagram for explaining a watch point and a virtual viewpoint according to the first embodiment.

FIG. 3 is a schematic diagram for explaining the watch point and the virtual viewpoint which are mentioned above. As shown in FIG. 3, in a 3D virtual space 500, an object 501 is disposed. In this example, at the center of the object 501, a watch point 505 is set. Then, the viewpoint image in the case where the watch point 505 is viewed from a virtual viewpoint 510 is generated. The viewpoint image is output to a display apparatus serving as the display unit 106.

For example, the rendering unit 120 reads, from the storage unit 108 or the like, data relating to the polygon or texture in a 3D map. Then, the viewpoint image is generated as a 2D image, and the 2D image generated is output. It should be noted that a generation method of an image that represents the 3D virtual space 500 and a technique or the like used therefor are not limited. Further, as the viewpoint image, the 3D image is generated and may be output to a display apparatus capable of displaying the 3D image.

The face detection unit 121 receives a taken image of an operator from the camera which functions as the image pickup unit 110 and detects the face of the operator from the taken image. For example, the face detection process is carried out with respect to a 2D taken image which is input from the camera. For the face detection process, an algorism such as Viola-Jones based on learning is used. However, the technique used for the face detection process is not limited, and another technique, algorism, or the like may be used as appropriate.

In this embodiment, as a result of the detection by the face detection unit 121, face rectangle coordinate data is output which indicates a position where the face is detected in a coordinate system (in units of x-y pixel) of the taken image. The face rectangle coordinate data is output to the face position calculation unit 122.

The face position calculation unit 122 calculates the position of the center of gravity of a rectangle from the face rectangle coordinate data, and the position of the face is calculated from the center of the gravity. Further, the face position calculation unit 122 calculates the size of the face from the width and the height of the rectangle. The data of the position and the size of the face calculated by the face position calculation unit 122 is output to the virtual viewpoint determination unit 124.

In this embodiment, the face detection unit 121 and the face position calculation unit 122 function as detection units that detect a movement of the operator. As described above, in this embodiment, the movement of the operator is detected from the taken image of the operator. Further, from the taken image of the operator, the position of the face of the operator is detected.

The watch point determination unit 123 determines the watch point 505 on the basis of an operation input by using a controller serving as the input unit 107. In this embodiment, the watch point determination unit 123 functions as a setting unit that sets the watch point.

For example, a pointer is displayed which is capable of selecting a specific position on a 2D image displayed. The operator operates the controller to move the pointer to a desired position on the 2D image. Then, the operator presses a predetermined button or the like, thereby determining the position of the pointer as the watch point 505.

Alternatively, the object 501 such as the 3D polygon displayed on the position of the pointer may be set as a watch object. For example, the center position or the position of the center of gravity of the watch object which has been set may be determined as the watch point 505. Alternatively, on the basis of the shape or the like of the object 501 selected as the watch object, a point at which the surrounding of the object 501 can be easily observed may be determined as the watch point 505 as appropriate.

In this embodiment, by referring to the 3D map, 3D coordinates of the watch point 505 are calculated. The data of the coordinates is output to the virtual viewpoint determination unit 124.

It should be noted that as the position of the pointer operated by using the controller, 2D coordinates are input, and on the basis of the 2D coordinates, the 3D coordinates of the watch point 505 may be set. Alternatively, in the case where the pointer can be displayed in accordance with the 3D coordinates, the 3D coordinates are input as the position of the pointer, and the coordinates may be set as the coordinates of the watch point 505.

The virtual viewpoint determination unit 124 determines the virtual viewpoint 510 with the watch point 505 as a reference on the basis of the position and the size of the face. In the case where the position and the size of the face are displaced, in accordance with the displacement, the virtual viewpoint 510 is displaced as the watch point 505 as a reference. In other words, in this embodiment, the virtual viewpoint determination unit 124 functions as a viewpoint displacement unit that displaces the virtual viewpoint 510 as the watch point 505 set as the reference on the basis of the detected movement of the operator. The virtual viewpoint is represented with the 3D coordinates.

Figure 4A:
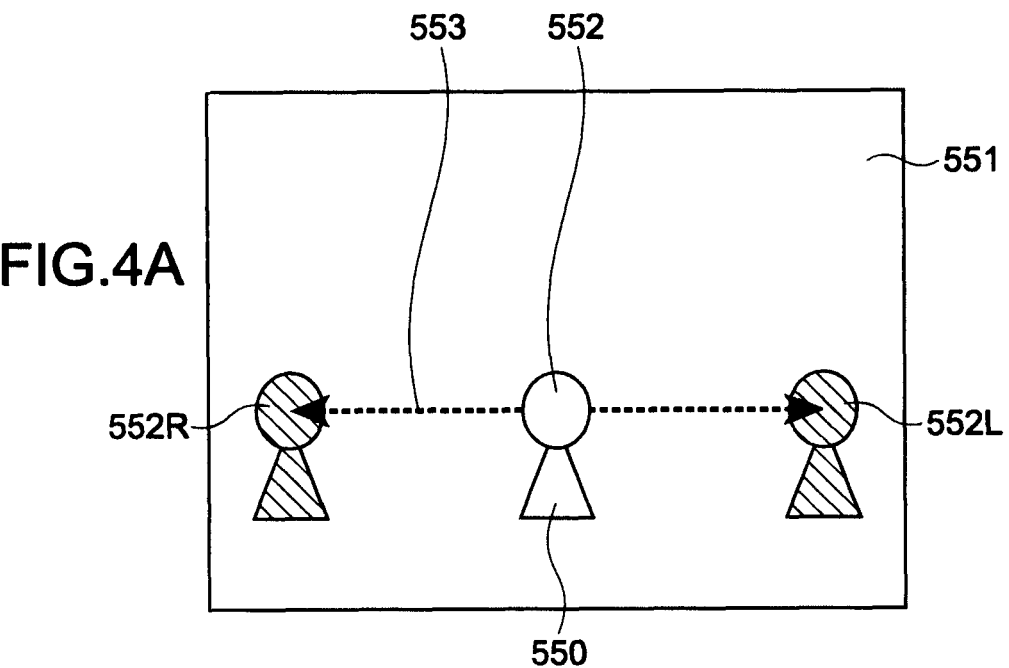
FIG. 4 are schematic diagrams each showing an example of a determination process of the virtual viewpoint with the watch point as a reference according to the first embodiment.
Figure 5A:
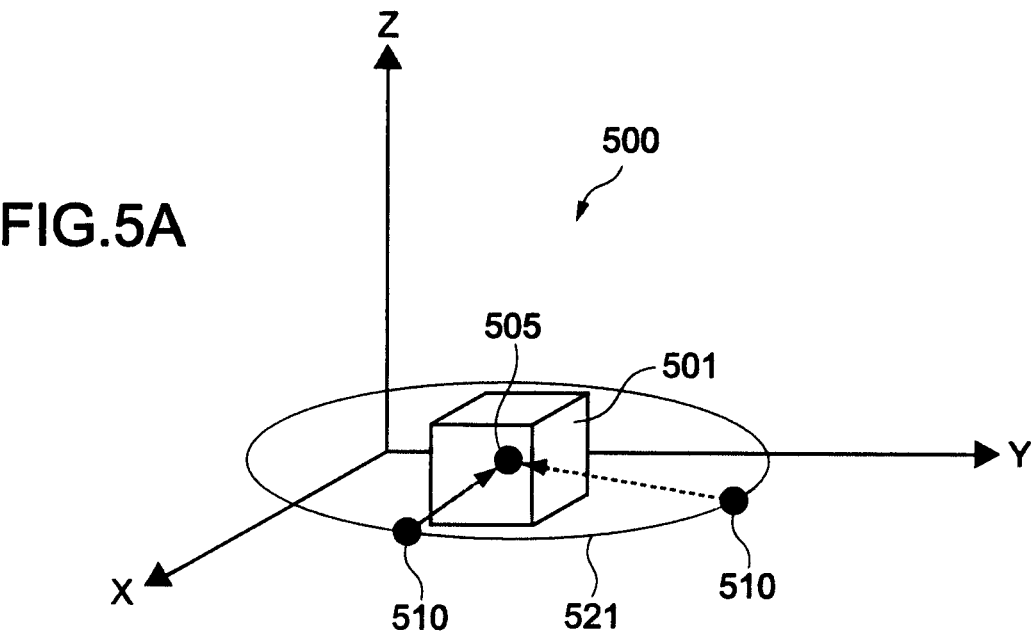
FIG. 5 are schematic diagrams each showing an example of the determination process of the virtual viewpoint with the watch point as a reference according to the first embodiment.
Figure 5B:
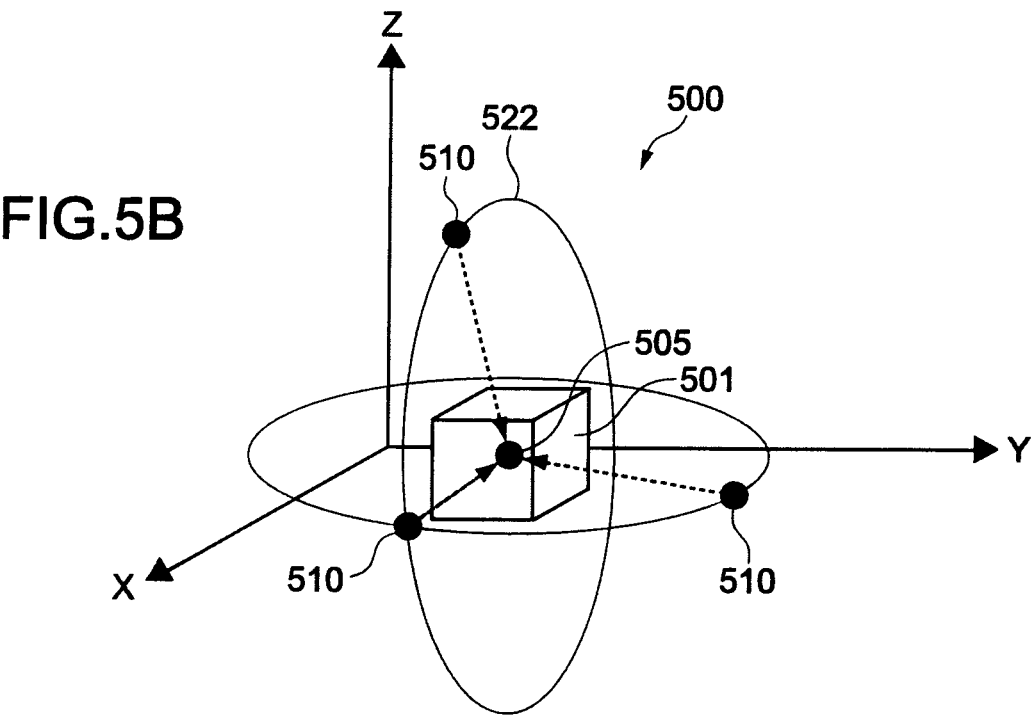
Figure 6:
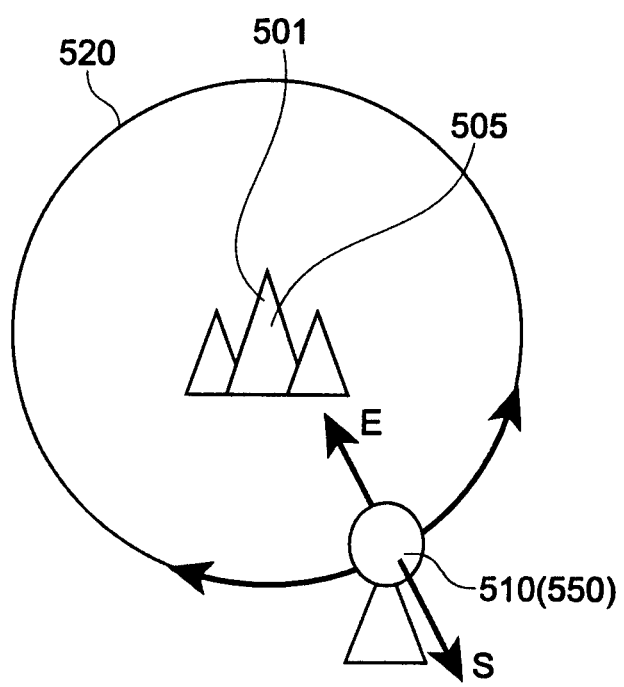
FIG. 6 is a schematic diagram showing an example of the determination process of the virtual viewpoint with the watch point as a reference according to the first embodiment.

FIGS. 4 to 6 are schematic diagrams each showing an example of a determination process of the virtual viewpoint 510 with the watch point 505 as the reference. As shown in FIG. 4A, from a taken image 551 of an operator 550, a position of a face 552 of the operator 550 and a displacement 553 thereof are calculated.

For example, when the operator 550 moves the face to the right side with respect to a display screen, the face 552 of the operator 550 is displayed on the left side in the taken image 551 (see, reference symbol 552R). That is, in the case where the position of the face 552 is displaced to the left side in the taken image 551, the movement of the operator 550 to the right side is detected.

On the other hand, for example, when the operator 550 moves the face to the left side with respect to the display screen, the face 552 of the operator 550 is displayed on the right side in the taken image 551 (see, reference symbol 552L). That is, in the case where the position of the face 552 is displaced to the right side in the taken image 551, the movement of the operator 550 to the left side is detected.

Figure 4B:
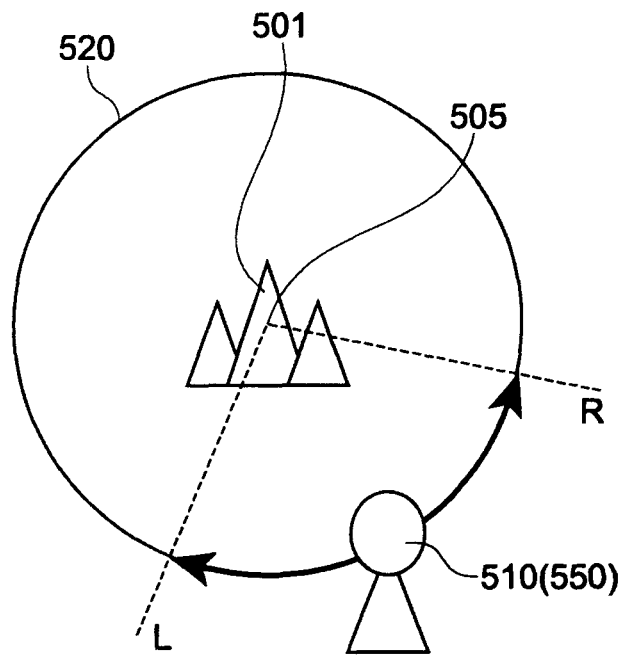

As shown in FIG. 4B, in this embodiment, the virtual viewpoint 510 is disposed on a sphere 520 with the watch point 505 as the center. On the basis of the displacement of the detected position of the face 552, the virtual viewpoint 510 is displaced so as to rotate about the watch point 505 on the sphere 520. It should be noted that in FIG. 4B, the operator 550 is shown on the position of the virtual viewpoint 510 for ease of explanation.

In this embodiment, in accordance with the movement of the operator 550 to the right side, the virtual viewpoint 510 is displaced to the right side (in the direction directed by the arrow R) with respect to the watch point 505. Further, in accordance with the movement of the operator 550 to the left side, the virtual viewpoint 510 is displaced to the left side (in the direction directed by the arrow L) with respect to the watch point 505.

For example, as shown in FIG. 4A, in the case where the face 552 is moved in a horizontal direction, the virtual viewpoint 510 may be displaced on a circumference of a circle 521 in parallel to an XY plane with the watch point 505 as the center as shown in FIG. 5A. As a result, it is possible to perform an operation of coming around from right and left while watching the watch point 505.

Further, the movement of the face 552 in a vertical direction can be detected from the taken image 551. In this case, as shown in FIG. 5B, the virtual viewpoint 510 may be displaced on a circumference of a circle 522 in parallel to an XZ plane with the watch point 505 as the center. In the case where the face is moved upward, the virtual viewpoint 510 is displaced in a direction of watching from above with respect to the object 501. In the case where the face is moved downward, the virtual viewpoint 510 is displaced in a direction opposite thereto.

As described above, in this embodiment, the movements of the face in the horizontal direction and the vertical direction are detected, and the virtual viewpoint 510 is displaced on the sphere 520 in accordance with the movements. As a result, it is possible to attain an image display system with high operability which is based on the movement of the operator 550.

It should be noted that the displacement of the virtual viewpoint 510 corresponding to the movement of the face in the horizontal direction and the vertical direction is not limited to the displacement described above. For example, on the basis of the shape, the size, or the like of the object 501, the displacement of the position of the face and the displacement of the virtual viewpoint 510 may be matched as appropriate.

As shown in FIG. 6, in this embodiment, for the determination process of the virtual viewpoint 510, data of the size of the face is also used. In this embodiment, a mapping is employed in which a variation in the size of the face (i.e., distance between the camera and the face) is reflected on a change in a distance between the object 501 and the operator 550.

That is, in this embodiment, a radius of the sphere 520 is determined on the basis of the size of the face 552. In the case where the operator 550 moves the face 552 closer to the display screen, an increase in the size of the face 552 is detected. Accordingly, in accordance with the increase in the size of the face, the radius of the sphere 520 is reduced (in the direction directed by the arrow E). That is, on the display screen, the object 501 is scaled up to be displayed.

On the other hand, in the case where the operator 550 moves the face 552 away from the display screen, a reduction in the size of the face 552 is detected. Accordingly, in accordance with the reduction in the size of the face 552, the radius of the sphere 520 is increased (in the direction directed by the arrow S). That is, on the display screen, the object 501 is scaled down to be displayed. As described above, with the use of the data relating to the size of the face, it is possible to attain the image display system with high operability which is based on the movement of the operator 550.

In the case where the virtual viewpoint 510 is set first, the virtual viewpoint 510 may be subjected to a default setting in advance. Then, a viewpoint image in the case where the watch point 505 is viewed from the virtual viewpoint 510 may be generated. After that, on the basis of the displacement of the position and the size of the face 552, the displacement process of the virtual viewpoint 510 as described above may be carried out.

Figure 7:
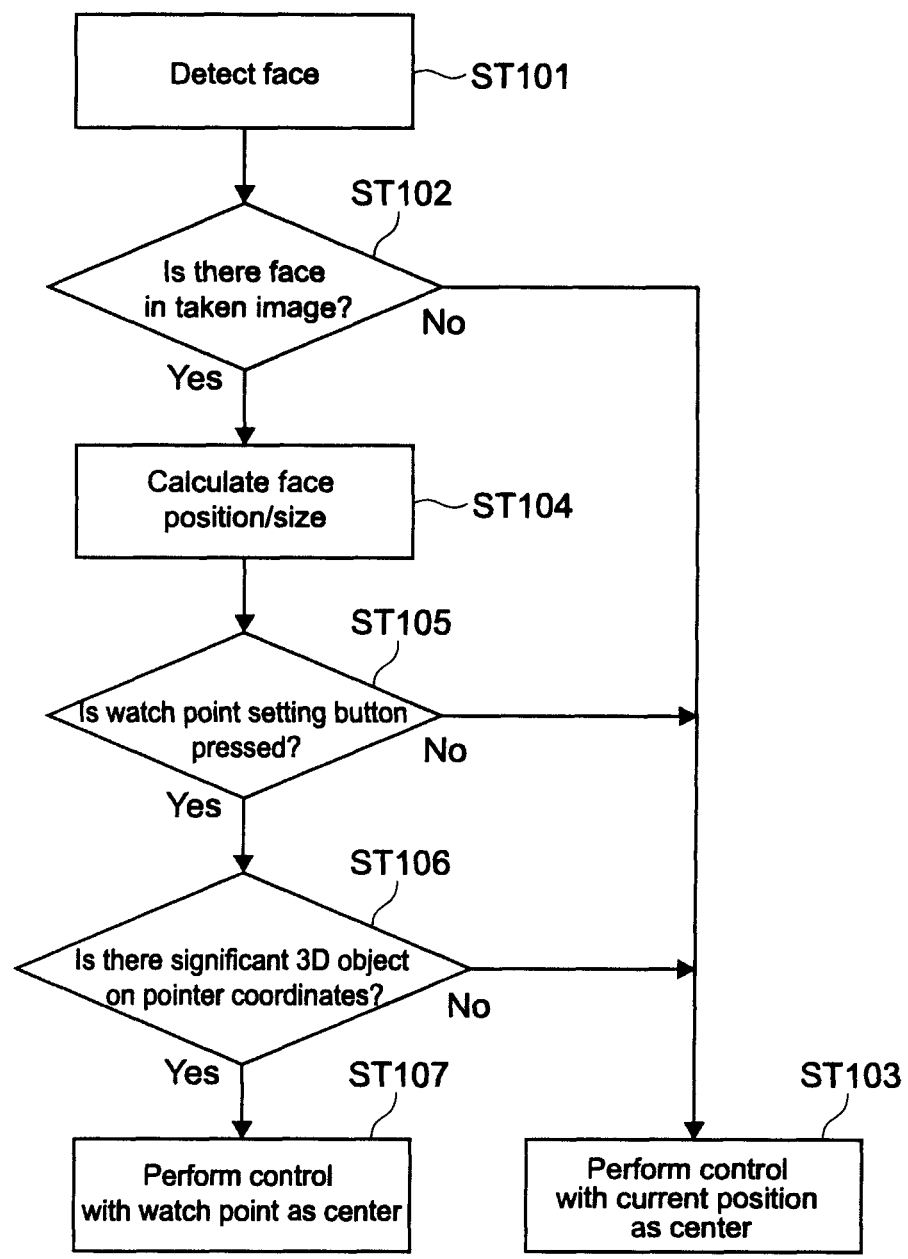
FIG. 7 is a flowchart showing an operation example of the information processing apparatus according to the first embodiment.

FIG. 7 is a flowchart showing an operation example of the information processing apparatus 100 according to this embodiment.

First, the face detection unit 121 carries out the face detection process (Step 101). Then, it is determined whether the face 552 exists in the taken image 551 or not (Step 102). In the case where it is determined that the face 552 does not exist in the taken image 551 (No), viewpoint control with a current position as the center is performed (Step 103).

The viewpoint control with the current position as the center will be described. FIG. 8 are schematic diagrams for explaining the viewpoint control with the current position as the center. In this embodiment, on the basis of an operation with the use of an arrow key or the like of the controller, the viewpoint control with the current position as the center to be described in the following is performed.

Figure 8A:
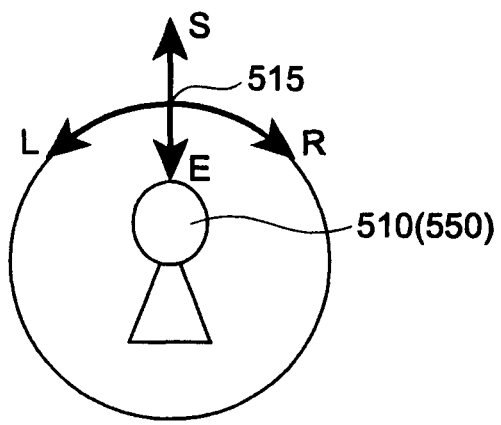
FIG. 8 are schematic diagrams for explaining viewpoint control with a current position as the center according to the first embodiment.

As shown in FIG. 8, the viewpoint control with the current position as the center is viewpoint control in which a target point 515 is displaced with the current virtual viewpoint 510 as the center. The target point 515 is a point to be viewed from the virtual viewpoint 510. As shown in FIG. 8A, the target point 515 is displaced in rotation directions and in linear directions (directed by the arrows R, L, E, and S) with the virtual viewpoint 510 as the reference.

Figure 8B:
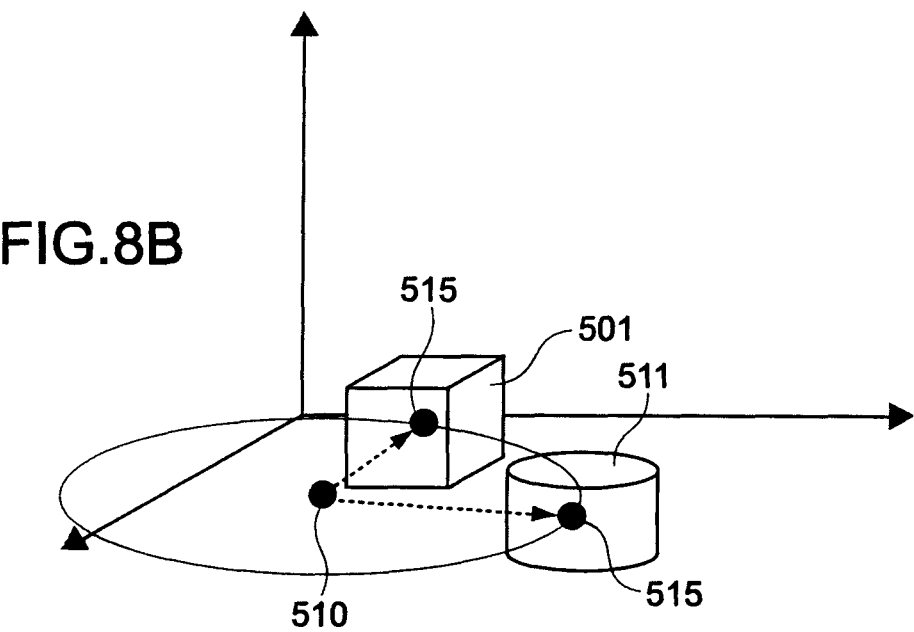

Then, as shown in FIG. 8B, the target point 515 is displaced from the object 501 to another object 511. A viewpoint image in which the object 511 is displayed is generated. That is, the viewpoint control with the current position as the center enables the operator 550 to perform an operation of viewing the operator's surrounding, for example.

It should be noted that the viewpoint control is not limited to the case where the virtual viewpoint 510 is fixed in position, and the target point 515 is rotated therearound, for example. So-called first-person viewpoint control may be variously employed in which the operator 550 or a character or the like on the display screen which is operated by the operator 550 is set as a reference.

In Step 102, in the case where it is determined that the face 552 exists in the taken image 551 (Yes), the face position calculation unit 122 calculates the position and the size of the face (Step 104). Then, in Step 105, it is determined whether a button operation for setting the watch point 505 is input or not.

In the case where the button pressing operation is not input (No in Step 105), the viewpoint control with the current position as the center is performed (Step 103). In the case where the button pressing operation is input (Yes in Step 105), it is determined whether there is a significant 3D object on coordinates of a pointer on the display screen or not (Step 106). The significant 3D object refers to an object which can be a target to be subjected to the viewpoint control with the watch point as the center with the watch point 505 set as the reference as described above.

That is, in this embodiment, the object 501 which can be subjected to the viewpoint control with the watch point as the center is set in advance. In the case where the object 501 is selected with the pointer, the viewpoint control with the watch point as the center is performed (from Yes in Step 106 to Step 107).

The operator 550 can perform such an instinctive operation that the operator 550 comes around the object 501 to observe the object 501 while moving the face 552. As a result, for example, even in a display apparatus that displays a 2D image, it is possible to observe a viewpoint image while sufficiently feeling the 3D space.

In the case where it is determined that there is not the significant 3D object on the coordinates of the pointer (No in Step 106), the viewpoint control with the current position as the center is carried out (Step 103). In this way, by appropriately setting the significant object, it is possible to perform a smooth switching between the viewpoint control of Step 103 and the viewpoint control of Step 107. For example, it is possible to make such a setting that the viewpoint control with the watch point as the center can be performed only in the case of an important object such as a treasure box.

It should be noted that the viewpoint control with the watch point as the center may be typically performed without setting the significant object, if a watch point setting button of the controller is pressed.

As shown in the flowchart of FIG. 7, in this embodiment, the viewpoint control with the current position as the center with the use of the controller is performed basically. As a result, first, the operator 550 can instinctively operate a movement at a first-person viewpoint, a movement of a character, or the like.

In the viewpoint control, however, when the important object 501 is come around to be carefully observed, for example, it is necessary to move the target point 515 while performing a rotational movement. In other words, an operation for adjusting a direction of a line of sight while moving has to be repeated, which may make the operation complicated.

In this case, the operator 550 uses the controller to set the watch point 505 on the important object 501. As a result, the viewpoint control with the watch point as the center is selected as shown in Step 107. Consequently, the operator 550 can come around the object 501 while moving the face 552, to observe the object 501 carefully from various angles. Thus, the image display system having high operability and a high degree of freedom is attained.

As described above, in the information processing apparatus 100 according to this embodiment, the viewpoint image in the case where the watch point 505 is viewed from the predetermined virtual viewpoint 510 is generated. Then, on the basis of the movement of the operator 550, the virtual viewpoint 510 is displaced with the set watch point 505 as the reference. As a result, it is possible to attain the image display system having high operability which is based on the movement of the operator 550.

Further, in this embodiment, the virtual viewpoint 510 is displaced with the watch point 505 as the center. As a result, it is possible to perform such an instinctive operation that the watch point 505 and a watch object are come around to be watched in the 3D virtual space 500.

Further, in this embodiment, because the movement of the operator 550 is detected from the taken image 551 of the operator 550, the movement of the operator 550 can be detected with high precision. Further, because the virtual viewpoint 510 is displaced on the basis of the position and the size of the face 552, such an instinctive operation that the operator watches the watch point 505 by moving the face is possible. Furthermore, in this embodiment, with the use of the controller, it is possible to perform such an operation that the watch point 505 is set to the object 501 or the like on which the operator 550 focuses attention.

It should be noted that in the viewpoint control with the current position as the center shown in FIG. 8, the watch point 505 set in the viewpoint control with the watch point as the center may be used as the target point 515 as it is. That is, the watch point 505 may be displaced with the virtual viewpoint 510 as the reference, and in this case, the CPU 101 functions as a watch point displacement unit. Further, in the viewpoint control with the watch point as the center, the target point 515 that is set in the viewpoint control with the current position as the center may be used as the watch point 505 as it is.

In this case, for example, a button or the like for switching between the two viewpoint control operations may be set to the controller. With the operation of the button, the CPU 101 performs switching between the viewpoint displacement unit and the watch point displacement unit (CPU 101 functions as a switching unit). As a result, it is possible to perform a switching process of the two viewpoint control operations with the points (watch point 505 and target point 515) viewed in the viewpoint control operations as the references. Consequently, the image display system having high operability is attained.

Second Embodiment

A description will be given on an information processing apparatus according to a second embodiment of the present disclosure. In the following description, a description on the same structures and operations as the information processing apparatus 100 according to the first embodiment will be omitted or simplified.

Figure 9:
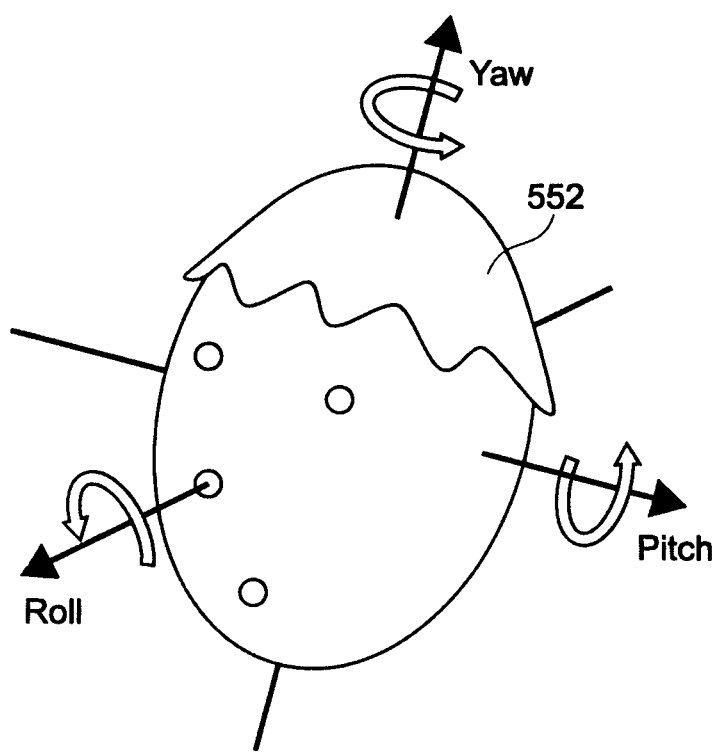
FIG. 9 is a schematic diagram for explaining an operation of an information processing apparatus according to a second embodiment of the present disclosure.

FIG. 9 is a schematic diagram for explaining an operation of an information processing apparatus according to the second embodiment of the present disclosure. In this embodiment, from an image of the face 552 of the operator, a direction of the face 552 of the operator is detected. On the basis of the displacement of the direction of the face 552 which is detected, a virtual viewpoint is displaced with the watch point as a reference.

For example, from a face image of the operator, positions of parts such as a mouth, a nose, and eyes, sizes thereof, or the like are detected. On the basis of the positions or sizes thereof or the like, the direction of the face 552 is detected. In addition, various face tracking systems for detecting the direction or the like of the face 552 may be used. Further, for example, a sight line analysis technique capable of analyzing a direction of a line of sight may be used as appropriate.

As shown in FIG. 9, in this embodiment, the direction of the face 552 refers to the direction of the face 552 by a rotation in three-axis directions and includes three kinds of a roll, a pitch, and a yaw for the axis directions, respectively. Typically, in accordance with the rotation direction of a yaw axis, the virtual viewpoint is displaced.

For example, the operator displaces the direction of the face to a left side with respect to an object (direction directed by the arrow of the yaw axis shown in FIG. 9). With this operation, such a viewpoint image as to see into the object from the right side is generated. That is, such a viewpoint image that the operator comes around in the direction directed by the arrow R of FIG. 4B is generated.

On the other hand, if the operator displaces the face to the right side, such a viewpoint image that the operator sees into the object from the left side is generated. That is, such a viewpoint image that the object is rotated in the same direction as the direction of the face of the operator is generated. As a result, the image display system having high operability is attained.

It should be noted that it is possible to set a correspondence relationship (mapping) between the direction of the face 552 and the displacement of the virtual viewpoint as appropriate. For example, the face 552 is rotated in a rotation direction of the pitch axis shown in FIG. 9. In this case, such a viewpoint image as to come around and view the object in a vertical direction may be generated.

As in this embodiment, by displacing the virtual viewpoint on the basis of the displacement of the direction of the face 552, it is also possible to perform such an instinctive operation as to view the watch point by moving the face 552.

Third Embodiment

FIG. 10 are schematic diagrams for explaining an operation of an information processing apparatus according to a third embodiment of the present disclosure. In this embodiment, a movement of a hand 652 of the operator is detected from a taken image 651 of the operator. On the basis of a position, a direction, a posture, and the like of the hand 652 of the operator, a virtual viewpoint 610 is displaced.

Figure 10A:
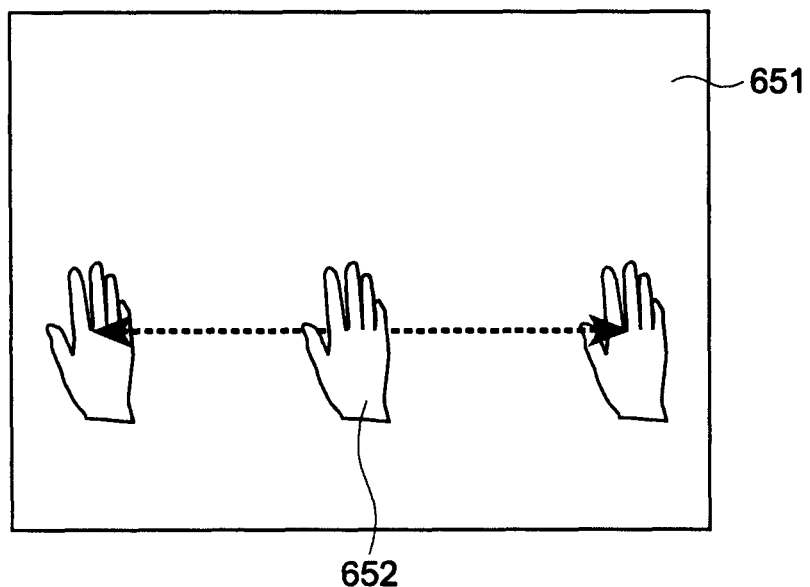
FIG. 10 are schematic diagrams for explaining an operation of an information processing apparatus according to a third embodiment of the present disclosure.
Figure 10B:
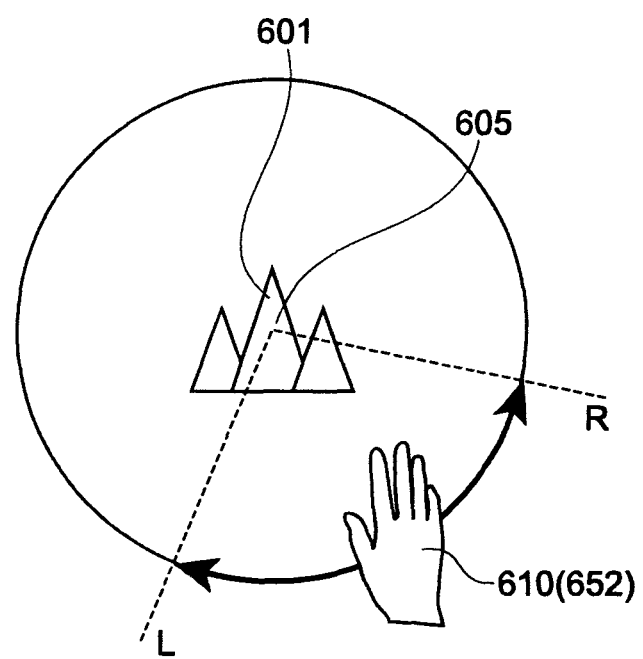

For example, if the operator moves the hand 652 to a right side with respect to the display screen (moves the hand to a left side in the taken image 651 shown in FIG. 10A), as shown in FIG. 10B, such a viewpoint image as to come around to a left side of an object 601 (arrow L) is generated. On the other hand, if the operator moves the hand 652 to the left side with respect to the display screen (right side in the taken image 651), such a viewpoint image as to come around to a right side of the object 601 (arrow R) is generated.

That is, in this embodiment, it is possible to perform such an instinctive operation as to view a surrounding or the like of the object 601 while rotating the object 601 including a watch point 605 with the hand, for example. It should be noted that it is possible to set a correspondence relationship between the displacement of the hand 652 and the displacement of the virtual viewpoint 610 as appropriate. For example, such a setting that the object can be come around and viewed in a direction in which the hand is moved may be made.

Further, such a viewpoint image that, when the hand 652 is moved up and down with respect to the display screen, the object 601 is come around and viewed in a vertical direction in accordance with the movement may be generated.

As described above, the virtual viewpoint may be displaced on the basis of the movement of not the face but the hand of the operator. In addition, the virtual viewpoint may be displaced on the basis of a position, a direction, a posture, or the like of another part of a body or an entire body.

MODIFIED EXAMPLE

The embodiments of the present disclosure are not limited to the embodiments described above and are variously modified.

Figure 11:
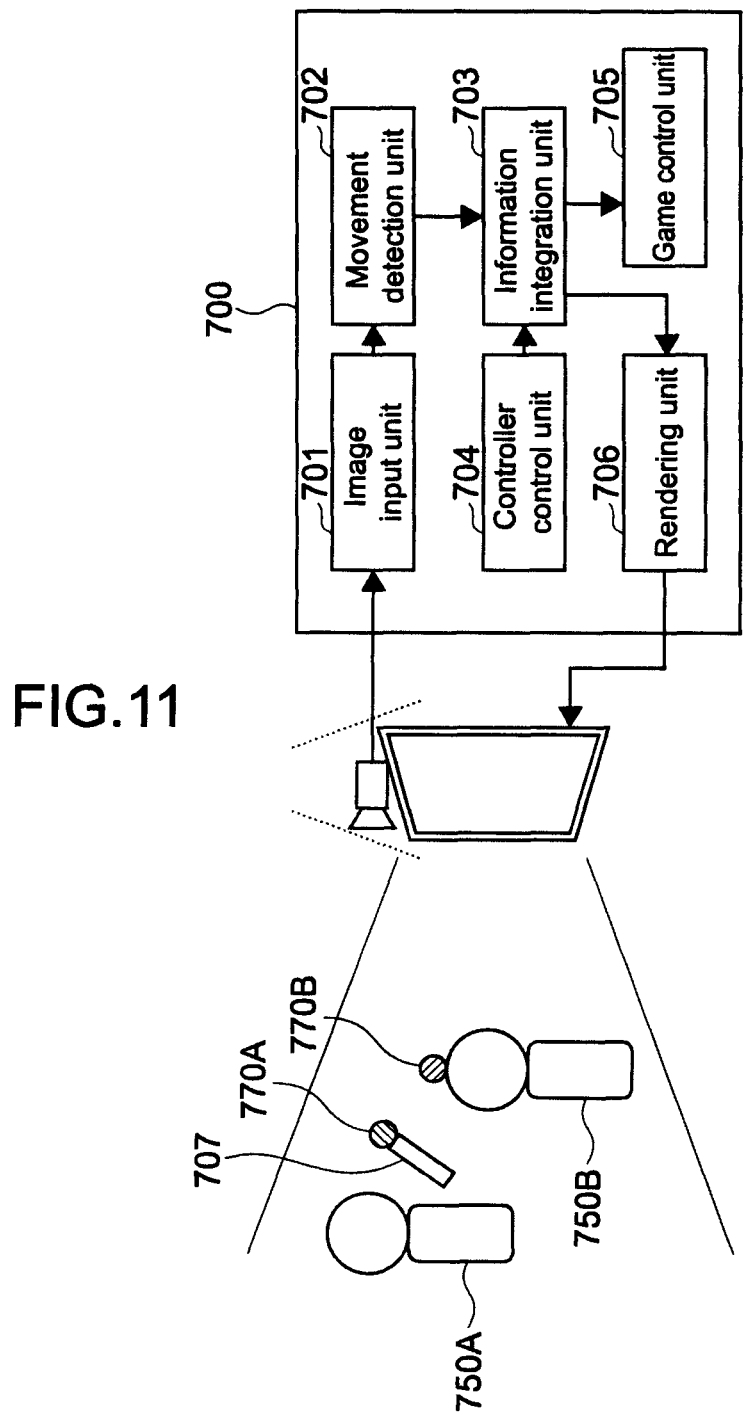
FIG. 11 is a schematic diagram showing another example of the image display system according to the present disclosure.

For example, FIG. 11 is a schematic diagram showing another example of an image display system according to the present disclosure. In this embodiment, a detection target object 770 for detecting a movement of an operator 750 is provided to the operator 750. For example, a controller 707 having a detection target object 770A for detecting the movement of a hand of an operator 750A is held by the hand. Further, on a head of an operator 750B, a detection target object 770B for detecting a position, a direction, and the like of the operator 750B is provided.

In an information processing apparatus 700 of this modified example, on the basis of a taken image of the operator 750, the movement of the operator 750 is detected with the detection target object 770 as a reference (image input unit 701 and movement detection unit 702). Then, data thereof is output to an information integration unit 703. Further, information or the like relating to a watch point setting operation with the controller 707 or the like is also output to the information integration unit 703 from a controller control unit 704. The information integration unit 703 performs a displacement process of the virtual viewpoint as described above, and information thereof is output to a game control unit 705 and a rendering unit 706.

As described above, the detection target object 770 for detecting the movement of the operator 750 may be used in an auxiliary manner. In this embodiment, a light emitting body that emits colored light is used as the detection target object 770. As a result, it is possible to easily detect the movement of the operator (movement of the light emitting body) in performing an image analysis. However, the detection target object is not limited thereto, and various objects may be used therefor.

In addition, the movement of the operator may be detected without using the taken image of the operator. For example, an infrared ray sensor, a ranging sensor, and the like are combined with each other as appropriate to constitute the detection unit, and the movement of the operator may be detected by those sensors. Further, an eye camera or the like for analyzing a line of sight of the operator may be used to detect the position, the direction, and the like of the face of the operator.

In addition, various techniques, apparatuses, and the like may be used as appropriate to detect the position and the direction of the face of the operator, the line of sight thereof, the movement of the hand thereof, the movement of the body thereof, or the like.

Further, in the embodiments described above, the watch point is determined on the basis of the operation input with the controller. However, on the basis of the movement of the operator detected by the detection unit, the watch point may be determined. For example, in the case where the line of sight of the operator is detected, the watch point may be determined on the basis of existence or nonexistence of an object in a direction of the line of sight, a staying time period of the line of sight, or the like. Alternatively, on the basis of the movement of the hand, the position of the face, a stop time period thereof, or the like, an object on which the operator wants to focus attention may be calculated to determine the watch point. Alternatively, the watch point may be determined on the basis of voice from the operator.

Further, when the watch point is set, the watch point or an object including the watch point may be disposed at the center of the display screen. As a result, it is possible to sufficiently observe the object and the like on which the attention is focused. Alternatively, an adjustment of a display position of the watch point or the object may be made as appropriate in such a manner that the object disposed on the edge of the display screen is moved to the center, for example.

For example, the watch point is determined on the basis of the movement of the hand, and in accordance with the movement of the hand, the position of the watch point is moved to a predetermined position such as the center of the screen. Then, by moving the position of the face, an operation or the like of sufficiently observing a surrounding of the watch point can be performed.

In the above description, on the basis of the operation to the controller, the viewpoint control with the current position as the center is performed. However, the viewpoint control with the current position as the center may be performed on the basis of the movement of the operator. That is, both of the viewpoint control with the watch point as the center and the viewpoint control with the current position as the center may be performed on the basis of the movement of the operator. For example, the operator may operate a button or the like for switching the modes of the viewpoint control to switch the viewpoint control with the watch point as the center and the viewpoint control with the current position as the center as appropriate.

A displacement speed of the virtual viewpoint may be controlled in accordance with the movement of the operator. For example, in displacing the virtual viewpoint on the basis of the displacement of the position of the face, the displacement speed of the virtual viewpoint may be adjustable by the direction of the face. For example, in the case where an object is extremely large, only by a change in the position of the face, a range of the displacement of the virtual viewpoint may be limited, with the result that the entire surrounding of the object is difficult to be viewed. In this case, the direction of the face is changed, and the displacement speed of the virtual viewpoint is increased. As a result, in accordance with the change in the position of the face, the virtual viewpoint can be displaced to a large extent, which makes it possible to observe the entire surrounding of the object.

For example, an icon or the like may be displayed on the display screen, which indicates to the operator that current viewpoint control is the viewpoint control with the current position as the center or the viewpoint control with the watch point as the center. For example, in the case where the current viewpoint control is the viewpoint control with the current position as the center, an icon as shown in FIG. 8A is displayed on a right corner or the like of the display screen. Further, in the case of the viewpoint control with the watch point as the center, an icon as shown in FIG. 6 is displayed on a display screen. As a result, the operability is improved for the operator.

Further, for example, in the case where the viewpoint control with the watch point as the center is selected, along with the icon as shown in FIG. 6, a text or an image that explains correspondence relationships between the position of the face or the like and the arrows of the icons may be displayed (e.g., a character such as right and left is displayed on the side of the arrow).

A combination of the embodiments and the modified example described above may be employed as an embodiment of the present disclosure.

It should be noted that the present disclosure can take the following configurations.

(1) An information processing apparatus, including:
an image generation unit configured to generate a viewpoint image in a case where a watch point set in a three-dimensional virtual space is viewed from a predetermined virtual viewpoint;
a detection unit configured to detect a movement of an operator; and
a viewpoint displacement unit configured to displace the virtual viewpoint with the set watch point as a reference on the basis of the detected movement of the operator.

(2) The information processing apparatus according to Item (1), in which
the viewpoint displacement unit is configured to displace the virtual viewpoint with the set watch point as a center.

(3) The information processing apparatus according to Item (1) or (2), in which the detection unit is configured to detect the movement of the operator from a taken image of the operator.

(4) The information processing apparatus according to any one of Items (1) to (3), in which
the detection unit is configured to detect a position of a face of the operator, and
the viewpoint displacement unit is configured to displace the virtual viewpoint on the basis of a displacement of the position of the face.

(5) The information processing apparatus according to any one of Items (1) to (4), in which
the detection unit is configured to detect a direction of a face of the operator, and
the viewpoint displacement unit is configured to displace the virtual viewpoint on the basis of a displacement of the direction of the face.

(6) The information processing apparatus according to any one of Items (1) to (5), in which
the detection unit is configured to detect a movement of a hand of the operator, and
the viewpoint displacement unit is configured to displace the virtual viewpoint on the basis of the movement of the hand.

(7) The information processing apparatus according to any one of Items (1) to (6), further including
a setting unit configured to set the watch point.

(8) The information processing apparatus according to Item (7), further including
an interface unit configured to receive an operation by the operator, in which
the setting unit sets the watch point on the basis of the operation received by the interface unit.

(9) The information processing apparatus according to Item (7) or (8), in which
the setting unit sets the watch point on the basis of the detected movement of the operator.

(10) The information processing apparatus according to any one of Items (1) to (9), further including:
a watch point displacement unit configured to displace the watch point with the virtual viewpoint as a reference; and
a switching unit configured to switch between the viewpoint displacement unit and the watch point displacement unit.

(11) An information processing method, including:
generating a viewpoint image in a case where a watch point set in a three-dimensional virtual space is viewed from a predetermined virtual viewpoint;
detecting a movement of an operator; and
displacing the virtual viewpoint with the set watch point as a reference on the basis of the detected movement of the operator.

(12) A program causing a computer to execute the steps of:
generating a viewpoint image in a case where a watch point set in a three-dimensional virtual space is viewed from a predetermined virtual viewpoint;
detecting a movement of an operator; and
displacing the virtual viewpoint with the set watch point as a reference on the basis of the detected movement of the operator.

(13) The program according to Item (12), in which
the displacing step displaces the virtual viewpoint with the set watch point as a center.

(14) The program according to Item (12) or (13), in which
the detecting step detects the movement of the operator from a taken image of the operator.

(15) The program according to any one of Items (12) to (14), in which the detecting step detects a position of a face of the operator, and the displacing step displaces the virtual viewpoint on the basis of a displacement of the position of the face.

(16) The program according to any one of Items (12) to (15), in which the detecting step detects a direction of a face of the operator, and the displacing step displaces the virtual viewpoint on the basis of a displacement of the direction of the face.

(17) The program according to any one of Items (12) to (16), in which the detecting step detects a movement of a hand of the operator, and the displacing step displaces the virtual viewpoint on the basis of the movement of the hand.

(18) The program according to any one of Items (12) to (17) that causes the computer to further execute the step of setting the watch point.

(19) The program according to Item (18) that causes the computer to further execute the step of receiving an operation by the operator, in which the setting step sets the watch point on the basis of the operation received.

(20) The program according to Item (18) or (19), in which the setting step sets the watch point on the basis of the detected movement of the operator.

The present disclosure contains subject matter related to that disclosed in Japanese Priority Patent Application JP 2011-165129 filed in the Japan Patent Office on Jul. 28, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising: circuitry configured to:
   generate a viewpoint image for display, using three-dimensional coordinates of a watch point and a virtual viewpoint, wherein the viewpoint image represents a three-dimensional virtual space generated as a view of the watch point from the virtual viewpoint, the watch point being set in the three-dimensional virtual space;
   detect a movement of an operator within a real space, based upon image detection of the operator; and
   displace the virtual viewpoint with the set watch point as a reference on the basis of the detected movement of the operator within the real space, such that the virtual viewpoint is positionally changed about the set watch point and the generated viewpoint image is changed to represent a view of the set watch point from the displaced virtual viewpoint,
   wherein the virtual viewpoint is disposed on a sphere with the watch point as a center of the sphere, the virtual viewpoint is displaced so as to rotate about the watch point on the sphere, and a radius of the sphere is reduced in accordance with a shortening distance between the operator and a location of displaying the viewpoint image.

2. The information processing apparatus according to claim 1, wherein the circuitry is further configured to displace the virtual viewpoint with the set watch point as a center.

3. The information processing apparatus according to claim 1, wherein the circuitry is further configured to detect a position of a face of the operator, and to displace the virtual viewpoint on the basis of a displacement of the position of the face.

4. The information processing apparatus according to claim 1, wherein the circuitry is further configured to detect a direction of a face of the operator, and to displace the virtual viewpoint on the basis of a displacement of the direction of the face.

5. The information processing apparatus according to claim 1, wherein the circuitry is further configured to detect a movement of a hand of the operator, and to displace the virtual viewpoint on the basis of the movement of the hand.

6. The information processing apparatus according to claim 1, wherein the circuitry is further configured to set the watch point.

7. The information processing apparatus according to claim 6, wherein the circuitry is further configured to receive an operation by the operator, and to set the watch point on the basis of the received operation.

8. The information processing apparatus according to claim 6, wherein the circuitry is further configured to set the watch point on the basis of the detected movement of the operator.

9. The information processing apparatus according to claim 1, wherein the circuitry is further configured to:
   displace the watch point with the virtual viewpoint as a reference; and
   switch between initiating the virtual viewpoint displacement and initiating the watch point displacement.

10. The information processing apparatus according to claim 1, wherein the circuitry is further configured to detect the movement of the operator within the real space based on a difference between a current position of a part of a body of the operator within the real space and a previously-detected position of the part of the body of the operator within the real space.

11. The information processing apparatus according to claim 1, wherein the virtual viewpoint is displaced with the set watch point as the reference such that the virtual viewpoint is positionally changed about the set watch point while maintaining a relative direction of viewing that is from the virtual viewpoint and towards the set watch point, so as to view different sides of a displayed object that is associated with the set watch point, as the virtual viewpoint is displaced.

12. An information processing method, comprising:
   generating a viewpoint image for display, using three-dimensional coordinates of a watch point and a virtual viewpoint, wherein the viewpoint image represents a three-dimensional virtual space generated as a view of the watch point from the virtual viewpoint, the watch point being set in the three-dimensional virtual space;
   detecting a movement of an operator within a real space, based upon image detection of the operator; and
   displacing the virtual viewpoint with the set watch point as a reference on the basis of the detected movement of the operator within the real space, such that the virtual viewpoint is positionally changed about the set watch point and the generated viewpoint image is changed to represent a view of the set watch point from the displaced virtual viewpoint,
   wherein the virtual viewpoint is disposed on a sphere with the watch point as a center of the sphere, the virtual viewpoint is displaced so as to rotate about the watch point on the sphere, and a radius of the sphere is reduced in accordance with a shortening distance between the operator and a location of displaying the viewpoint image.

13. A non-transitory computer-readable storage medium having instructions that when executed cause a computer to perform the steps comprising:

generating a viewpoint image for display using three-dimensional coordinates of a watch point and a virtual viewpoint, wherein the viewpoint image represents a three-dimensional virtual space generated as a view of the watch point from the virtual viewpoint, the watch point being set in the three-dimensional virtual space;

detecting a movement of an operator within a real space, based upon image detection of the operator; and displacing the virtual viewpoint with the set watch point as a reference on the basis of the detected movement of the operator within the real space, such that the virtual viewpoint is positionally changed about the set watch point and the generated viewpoint image is changed to represent a view of the set watch point from the displaced virtual viewpoint, wherein the virtual viewpoint is disposed on a sphere with the watch point as a center of the sphere, the virtual viewpoint is displaced so as to rotate about the watch point on the sphere, and a radius of the sphere is reduced in accordance with a shortening distance between the operator and a location of displaying the viewpoint image.

14. The non-transitory computer-readable storage medium according to claim 13, wherein the displacing step displaces the virtual viewpoint with the set watch point as a center.

15. The non-transitory computer-readable storage medium according to claim 13, wherein the detecting step detects a position of a face of the operator, and the displacing step displaces the virtual viewpoint on the basis of a displacement of the position of the face.

16. The non-transitory computer-readable storage medium according to claim 13, wherein the detecting step detects a direction of a face of the operator, and the displacing step displaces the virtual viewpoint on the basis of a displacement of the direction of the face.

17. The non-transitory computer-readable storage medium according to claim 13, wherein the detecting step detects a movement of a hand of the operator, and the displacing step displaces the virtual viewpoint on the basis of the movement of the hand.

18. The non-transitory computer-readable storage medium according to claim 13, further comprising instructions that when executed cause the computer to:

set the watch point.

19. The non-transitory computer-readable storage medium according to claim 18, further comprising instructions that when executed cause the computer to:

receive an operation by the operator, wherein the setting step sets the watch point on the basis of the operation received.

20. The non-transitory computer-readable storage medium according to claim 18, wherein the setting step sets the watch point on the basis of the detected movement of the operator.

* * * * *